US007715719B2

(12) United States Patent  (10) Patent No.: US 7,715,719 B2
Bouda et al.  (45) Date of Patent: May 11, 2010

(54) SYSTEM AND METHOD FOR TRANSMITTING TRAFFIC IN A PLURALITY OF PASSIVE OPTICAL NETWORKS

(75) Inventors: Martin Bouda, Plano, TX (US); Takao Naito, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 11/627,793

(22) Filed: Jan. 26, 2007

(65) Prior Publication Data

US 2007/0280691 A1 Dec. 6, 2007

Related U.S. Application Data

(60) Provisional application No. 60/803,791, filed on Jun. 2, 2006.

(51) Int. Cl.
*H04J 14/00* (2006.01)
(52) U.S. Cl. .............................. 398/72; 398/67; 398/68; 398/100; 370/390; 370/392; 370/468; 370/352; 370/432; 725/105; 725/106; 725/127; 725/129
(58) Field of Classification Search .................. 398/66, 398/67, 68, 69, 70, 71, 72, 79, 59, 58, 60, 398/98, 99, 100; 370/390, 392, 468, 352; 370/432; 725/121, 125, 127, 129, 105, 106
See application file for complete search history.

(56) References Cited

U.S. PATENT DOCUMENTS 4,555,810 A   11/1985   Khoe et al.

(Continued)

FOREIGN PATENT DOCUMENTS

EP   1 028 331 A2   8/2000
EP   1 130 806 A2   9/2001
EP   1 434 375 A2   6/2004
WO   WO 2007/047559   4/2007
WO   WO 2007/081748   7/2007

OTHER PUBLICATIONS

Son et al., "Bidirectional WDM Passive Optical Network for Simultaneous Transmission of Data and Digital Broadcast Video Service," Journal of Lightwave Technology, vol. 21, No. 8, Aug. 2003, pp. 1723-1727.

(Continued)

*Primary Examiner*—Hanh Phan
(74) *Attorney, Agent, or Firm*—Baker Botts L.L.P.

(57) ABSTRACT

In accordance with the teachings of the present invention, a system and method for transmitting traffic in a plurality of passive optical networks (PONs) is provided. In a particular embodiment, a method for transmitting traffic in a plurality of passive optical networks (PONs) includes transmitting traffic at a first wavelength and at a second wavelength from an optical line terminal (OLT). The method also includes combining the traffic in the first wavelength and the traffic in the second wavelength and splitting the combined traffic into a plurality of copies. The method further includes forwarding a first copy to a first wavelength router at a first distribution node and forwarding a second copy to a second wavelength router at a second distribution node, wherein the first wavelength router is coupled to a first set of optical network units (ONUs) and the second wavelength router is coupled to a second set of ONUs. The method additionally includes routing the first copy such that only a subset of one or more ONUs in the first set of ONUs receives the traffic in the first wavelength and only a subset of one or more ONUs in the first set of ONUs receives the traffic in the second wavelength. The method also includes routing the second copy such that only a subset of one or more ONUs in the second set of ONUs receives the traffic in the first wavelength and only a subset of one or more ONUs in the second set of ONUs receives the traffic in the second wavelength.

14 Claims, 5 Drawing Sheets

U.S. PATENT DOCUMENTS

| | | | |
|---|---|---|---|
| 5,285,305 | A | 2/1994 | Cohen et al. |
| 5,321,541 | A | 6/1994 | Cohen |
| 5,440,416 | A | 8/1995 | Cohen et al. |
| 5,579,421 | A | 11/1996 | Duvall et al. |
| 5,694,234 | A | 12/1997 | Darcie et al. |
| 5,926,298 | A | 7/1999 | Li |
| 6,144,472 | A | 11/2000 | Knox |
| 6,163,637 | A | 12/2000 | Zirngibl |
| 6,411,410 | B1 | 6/2002 | Wright et al. |
| 6,498,876 | B1 | 12/2002 | Liu et al. |
| 6,767,139 | B2 | 7/2004 | Brun et al. |
| 7,245,829 | B1 | 7/2007 | Sindile |
| 7,389,048 | B2 | 6/2008 | Kani et al. |
| 7,583,669 | B2 * | 9/2009 | Yoo et al. ............... 370/390 |
| 2002/0196491 | A1 | 12/2002 | Deng et al. |
| 2003/0002102 | A1 | 1/2003 | Khalfallah et al. |
| 2004/0001718 | A1 | 1/2004 | Matthews et al. |
| 2004/0131357 | A1 | 7/2004 | Farmer et al. |
| 2004/0184806 | A1 | 9/2004 | Lee et al. |
| 2005/0129404 | A1 | 6/2005 | Kim et al. |
| 2005/0175343 | A1 | 8/2005 | Huang et al. |
| 2005/0175344 | A1 | 8/2005 | Huang et al. |
| 2005/0180689 | A1 | 8/2005 | Kozhevnikov et al. |
| 2006/0056849 | A1 | 3/2006 | Pamart et al. |
| 2006/0153567 | A1 | 7/2006 | Kim et al. |
| 2006/0257148 | A1 * | 11/2006 | Hirth et al. ............... 398/71 |
| 2007/0092249 | A1 | 4/2007 | Akasaka et al. |
| 2007/0092250 | A1 | 4/2007 | Bouda et al. |
| 2007/0092251 | A1 | 4/2007 | Bouda et al. |
| 2007/0092252 | A1 | 4/2007 | Bouda et al. |
| 2007/0092253 | A1 | 4/2007 | Bouda |
| 2007/0092254 | A1 | 4/2007 | Bouda |
| 2007/0092255 | A1 | 4/2007 | Bouda |
| 2007/0166037 | A1 | 7/2007 | Bouda |
| 2007/0166043 | A1 | 7/2007 | Bouda |
| 2007/0183779 | A1 | 8/2007 | Bouda |
| 2007/0280690 | A1 | 12/2007 | Bouda |
| 2007/0280691 | A1 | 12/2007 | Bouda |

OTHER PUBLICATIONS

Ching et al., "Passive Optical Networks," Sharing the Fiber, Telecom Equipment-Wireline, Merrill Lynch, May 15, 2001, pp. 1-27.

Kuhlow et al., "AWG-Based Device for a WDM Overlay PON in the 1.5-μm Bank," IEEE Photonics Technology Letters, vol. 11, No. 2, Feb. 1999, pp. 218-220.

Feldman et al., "An Evaluation of Architectures Incorporating Wavelength Division Multiplexing for Broad-Bank Fiber Access," Journal of Lightwave Technology, vol. 16, No. 9, Invited Paper, Sep. 1998, pp. 1546-1559.

Giles et al., "Access PON Using Downstream 1550-nm WDM Routing and Upstream 1300-nm SCMA Combining Through a Fiber-Grating Route," IEEE Photonics Technology Letters, vol. 8, No. 11, Nov. 1996, pp. 1549-1551.

Hilbk et al., "High Capacity WDM Overlay on a Passive Optical Network," Electronic Letters, Nov. 7, 1996, vol. 32, No. 23, pp. 2162-2163.

Inoue et al., "Silica-based Arrayed-Waveguide Grating Circuit as Optical Splitter/Router," Electronic Letters, Apr. 27, 1995, vol. 31, No. 9, pp. 726-727.

Kashima, "Upgrade of Passive Optical Subscriber Network," Journal of Lightwave Technology, vol. 9, No. 1, Jan. 1991, pp. 113-120.

Lin, "Passive Optical Subscriber Loops with Multiaccess," Journal of Lightwave Technology, vol. 7, No. 11, Nov. 1989, pp. 1769-1777.

MOOG Component Group, "(Mems)* Singlemode Fiber Optic Switch," FO5935, 2 pages, 2005.

Light Reading—Networking the Telecom Industry, PON & FTTx Update, Introduction, Aug. 8, 2005, Light Reading, Aug. 8, 2005, printed from web site Jan. 26, 2006, pp. 1-11, Retrieved from website Aug. 8, 2005.

ITU-T Telecommunication Standardization Sector of ITU-T, G.984.1, "Gigabit-Capable Passive Optical Network (GPON): General Characteristics," Series G: Transmission Systems and Media, Digital Systems and Networks, Digital Sections and Digital Line System—Optical Line Systems for Local and Access Networks, Mar. 2003, 20 pages.

ITU-T Telecommunication Standardization Sector of ITU-T, G.983.1, "Broadband Optical Access Systems Based on Passive Optical Networks (PON)," Series G: Transmission Systems and Media, Digital Systems and Networks, Digital Sections and Digital Line System—Optical Line Systems for Local and Access Networks, 124 pages, Jan. 2005, 123 pages.

ITU-T Telecommunication Standardization Sector of ITU-T, G.983.3, "A Broadband Optical Access System with Increased Service Capability by Wavelength Allocation," Series G: Transmission Systems and Media, Digital Systems and Networks, Digital Sections and Digital Line System—Optical Line Systems for Local and Access Networks, Mar. 2001, 59 pages.

ITU-T Telecommunication Standardization Sector of ITU-T, G.984.3, "Gigabit-Capable Passive Optical Network (G-PON): Transmission Convergence Layer Specification," Series G: Transmission Systems and Media, Digital Systems and Networks, Digital Sections and Digital Line System—Optical Line Systems for Local and Access Networks, Feb. 2004, 116 pages.

ITU-T Telecommunication Standardization Sector of ITU-T, G.984.3, Series G: Study Period 2005-2008, Updated Revised Amendment 1, : "Amendment to Gigabit-Capable Passive Optical Network (G-PON): Transmission Convergence Layer Specification (2004)," pp. 1-39, May 16-27, 2005.

Green, Paul E. Jr., Telecommunications Consultant, "Fiber-to-the-Home White Paper,", Feb. 21, 2003, pp. 1-21.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15-26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gbps to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol., part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Bouda, "A Distribution Node for a Wavelength-Sharing Network," filed Feb. 3, 2006, 64 pps., 9 pps. drawings, U.S. Appl. No. 11/347,612.

Bouda et al., "Distribution Components for a Wavelength-Sharing Network," filed Feb. 3, 2006, 69 pps., 9 pps. drawings, U.S. Appl. No. 11/347,585.

Bouda et al., "Upgradeable Passive Optical Network," filed Feb. 3, 2006, 66 pps, 9 pps. drawings, U.S. Appl. No. 11/347,446.

Bouda, "System and Method for Transmitting Upstream Traffic in an Optical Network," U.S. Appl. No. 11/426,875, filed Jun. 27, 2006, 49 pps., 5 pps. drawings.

Bouda, "System and Method for Managing Different Transmission Architectures in a Passive Optical Network," U.S. Appl. No. 11/627,793, 42 pps., 4 pps. drawings, Jan. 26, 2007.

Bouda, "System and Method for Distributing Traffic in an Optical Network," U.S. Appl. No. 11/426,879, filed Jun. 27, 2006, 43 pps., 5 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages, Mar. 5, 2004.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

SYSTEM AND METHOD FOR TRANSMITTING TRAFFIC IN A PLURALITY OF PASSIVE OPTICAL NETWORKS

CROSS-REFERENCE TO RELATED APPLICATIONS

This application claims benefit under 35 U.S.C. §119(e) of U.S. Provisional Application Ser. No. 60/803,791 filed Jun. 2, 2006 by Bouda and entitled System and Method for Transmitting Traffic in an Optical Network.

TECHNICAL FIELD

The present invention relates generally to communication systems and, more particularly, to a system and method for transmitting traffic in a plurality of passive optical networks.

BACKGROUND

In recent years, a bottlenecking of communication networks has occurred in the portion of the network known as the access network. Bandwidth on longhaul optical networks has increased sharply through new technologies such as wavelength division multiplexing (WDM) and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). In the upstream direction, ONUs typically time-share transmission of traffic in one wavelength. An ONU refers to a form of access node that converts optical signals transmitted via fiber to electrical signals that can be transmitted to individual subscribers and vice versa. PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (Gb/s) by using more powerful transmitters, providing even greater bandwidth. Other PSPONs include, for example, asynchronous transfer mode PONs (APONs) and gigabit Ethernet PONs (GE-PONs).

Although PSPON systems provide increased bandwidth in access networks, demand continues to grow for higher bandwidth. One solution, wavelength division multiplexing PON (WDMPON), would increase downstream (and upstream) capacity dramatically but inefficiently. WDMPONs refer to access networks in which each ONU receives and transmits traffic over a dedicated downstream and upstream wavelength, respectively. Although WDMPONs would increase capacity dramatically, they would do so at a prohibitively high cost for many operators and would supply capacity far exceeding current or near-future demand.

Another solution, a hybrid PON (HPON) between a PSPON and a WDMPON, would also increase downstream capacity. An HPON generally refers to any suitable PON that is not a full WDMPON but that either transmits downstream traffic in a plurality of wavelengths each shared by a group of wavelength-sharing ONUs or that transmits downstream traffic in a unique wavelength for each ONU. Although HPONs may be economical for some network operators, other network operators may believe that HPONs provide greater bandwidth than what they presently desire. These network operators may desire an upgrade solution that more closely meets their bandwidth needs.

SUMMARY

In accordance with the teachings of the present invention, a system and method for transmitting traffic in a plurality of passive optical networks (PONs) is provided. In a particular embodiment, a method for transmitting traffic in a plurality of passive optical networks (PONs) includes transmitting traffic at a first wavelength and at a second wavelength from an optical line terminal (OLT). The method also includes combining the traffic in the first wavelength and the traffic in the second wavelength and splitting the combined traffic into a plurality of copies. The method further includes forwarding a first copy to a first wavelength router at a first distribution node and forwarding a second copy to a second wavelength router at a second distribution node, wherein the first wavelength router is coupled to a first set of optical network units (ONUs) and the second wavelength router is coupled to a second set of ONUs. The method additionally includes routing the first copy such that only a subset of one or more ONUs in the first set of ONUs receives the traffic in the first wavelength and only a subset of one or more ONUs in the first set of ONUs receives the traffic in the second wavelength. The method also includes routing the second copy such that only a subset of one or more ONUs in the second set of ONUs receives the traffic in the first wavelength and only a subset of one or more ONUs in the second set of ONUs receives the traffic in the second wavelength.

Technical advantages of one or more embodiments of the present invention may include the more efficient allocation of bandwidth among optical network units (ONUs) of multiple PONs. For example, in certain areas, one PON may serve a business park and another PON may serve residential users. Typically, the ONUs of the business park PON share a downstream WDM wavelength, the ONUs of the residential PON share a downstream WDM wavelength, and no ONUs of the business park PON share a WDM wavelength with any of the ONUs of the residential PON. Such an allocation of bandwidth may be inefficient, for example, because the business park PON may be at capacity during the day but undersubscribed in the evening and the residential PON may be undersubscribed during the day but at capacity in the evening. Thus, by allowing a first subset of ONUs in the business park PON to share a first wavelength with a first subset of ONUs in the residential PON and a second subset of ONUs in the business park PON to share a second wavelength with a second subset of ONUs in the residential PON, particular embodiments allow for a more efficient allocation of bandwidth among ONUs of multiple PONs. Sharing wavelengths across multiple PONs allows the business park PON to better satisfy its bandwidth usage during the day and the residential PON to better satisfy its bandwidth usage during the evening.

Another technical advantage of one or more embodiments of the present invention may include upgrading a set of multiple PONs gradually from PSPONs to HPONs. Particular embodiments may provide an intermediate upgrade between PSPONs and HPONs that requires fewer transmitters at the OLT than an upgrade of each PSPON to an HPON. Thus, efficiency in bandwidth allocation may be achieved in particular embodiments without incurring the cost of several additional OLT transmitters. Network operators may then easily upgrade the downstream bandwidth per PON (e.g., upgrading each PON to an HPON) when additional bandwidth is required. In particular embodiments, such an upgrade in downstream bandwidth per PON may not require the replacement of the OLT card. Instead, the number of ONUs or remote nodes (RNs) connected to the OLT card may be reduced to provide the increase in downstream bandwidth for the PON connected to the OLT card.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
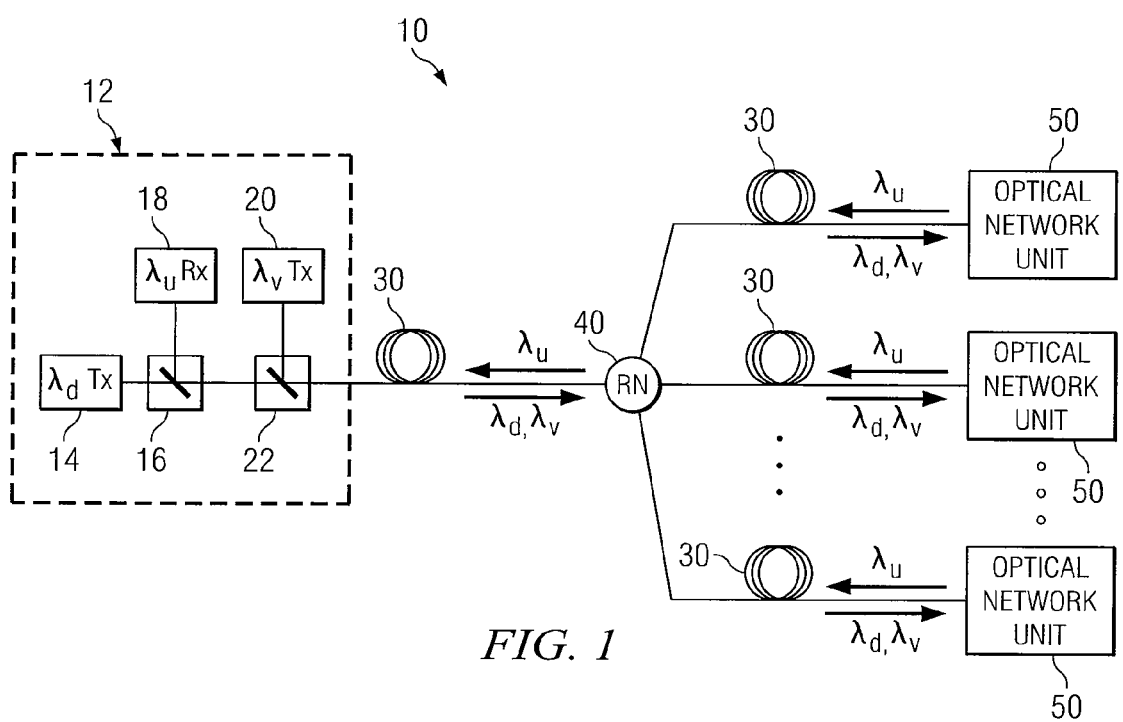
FIG. 1 is a diagram illustrating an example PSPON.

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (Kb/s) and 1.5 megabits per second (Mb/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (Gb/s) by using more powerful transmitters, provide even greater bandwidth.

Referring back to PSPON 10 of FIG. 1, PSPON 10 includes an Optical Line Terminal (OLT) 12, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 12, which may be an example of an upstream terminal, may reside at the carrier's central office, where it may be coupled to a larger communication network. OLT 12 includes a transmitter 14 operable to transmit traffic in a downstream wavelength, such as $\lambda_d$, for broadcast to all ONUs 50, which may reside at or near customer sites. OLT 12 may also include a transmitter 20 operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 12 also includes a receiver 18 operable to receive traffic from all ONUs 50 in a time-shared upstream wavelength, $\lambda_u$. OLT 12 may also comprise filters 16 and 22 to pass and reflect wavelengths appropriately.

It should be noted that, in typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should also be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers.

RN 40 of PSPON 10 (which may also generally be referred to as a distribution node) comprises any suitable power splitter, such as an optical coupler, and connects OLT 12 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 12.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 12, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, transmitter 14 of OLT 12 transmits downstream traffic for broadcast to ONUs 50 in $\lambda_d$. Transmitter 20 of OLT 12 may also transmit downstream analog video traffic for broadcast to ONUs 50 in $\lambda_v$. Traffic in $\lambda_d$ passes filter 16 and is combined with $\lambda_v$ at filter 22 (which passes $\lambda_d$ and reflects $\lambda_v$). The combined traffic then travels over optical fiber 30 to RN 40. RN 40 splits the downstream traffic into a suitable number of copies and forwards each copy to a corresponding ONU 50. Each ONU 50 receives a copy of the downstream traffic in $\lambda_d$ and $\lambda_v$ and processes the signal. Suitable addressing schemes may be used to identify which traffic is destined for which ONU 50.

In the upstream direction, each ONU 50 may transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal (at, e.g., the RN's power splitter). RN 40 then forwards the combined traffic over fiber 30 to OLT 12. At OLT 12, the combined traffic is passed by filter 22 and reflected by filter 16 to receiver 18. Receiver 18 receives the signal and processes it.

Figure 2:
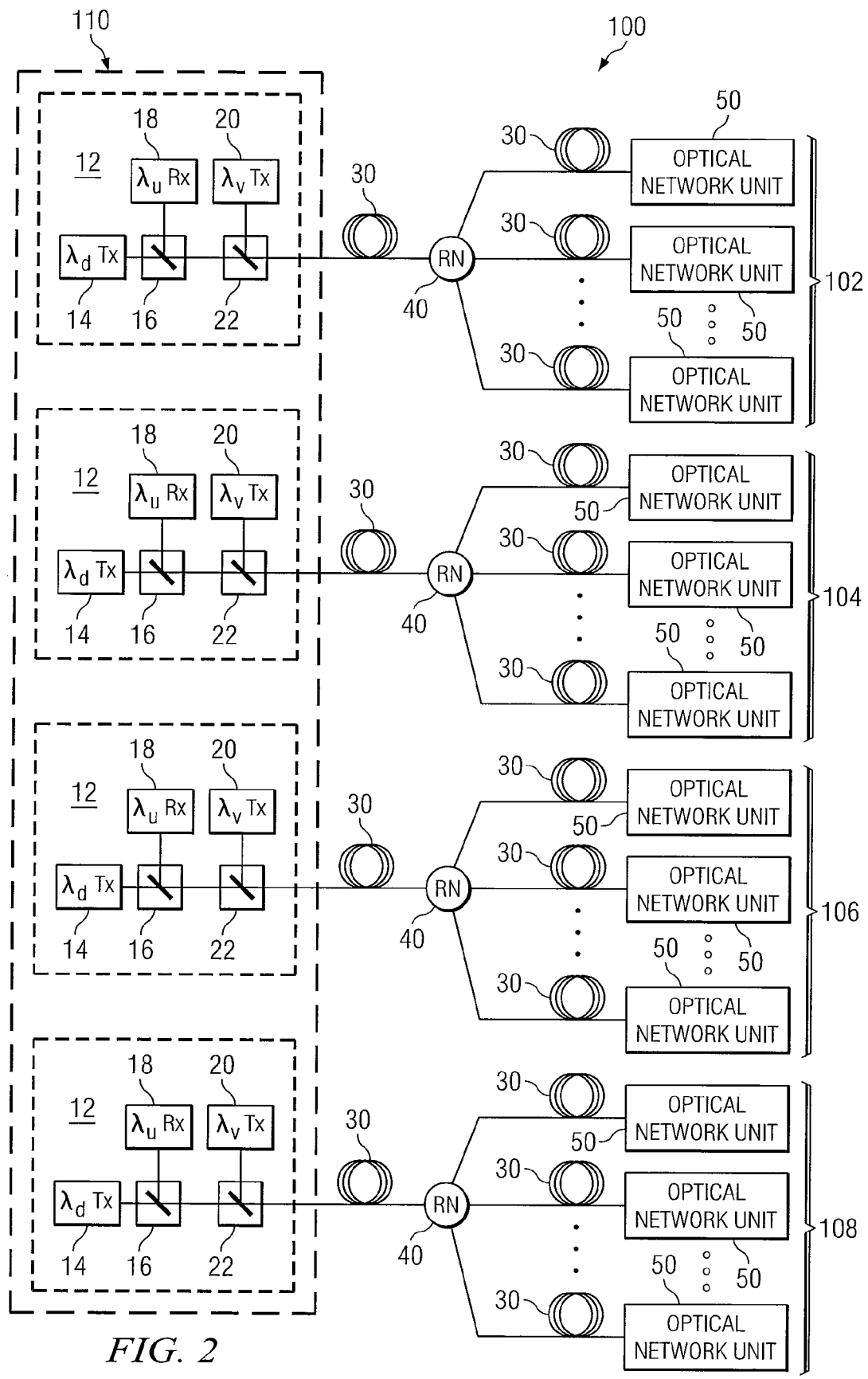
FIG. 2 is a diagram illustrating a set of example PSPONs managed at a carrier's central office.

FIG. 2 is a diagram illustrating a set 100 of example PSPONs 102, 104, 106, and 108 managed at a carrier's central office 110. Each PSPON 102, 104, 106, or 108 comprises an OLT 12, optical fiber 30, an RN 40, and ONUs 50. OLT 12, optical fiber 30, RN 40, and ONUs 50 are described above in conjunction with FIG. 1 and thus will not be described again in detail. It should be noted, however, that OLTs 12 of PSPONs 102, 104, 106, and 108 may reside on the same OLT card at the central office 110 in particular circumstances.

As illustrated in FIG. 2, ONUs 50 of different PONs 102, 104, 106, and 108 do not share a downstream wavelength $\lambda_d$ (i.e., each PON has a separate $\lambda_d$ transmitter). Thus, at times, a situation of inefficient downstream bandwidth allocation may arise where one PON may be at capacity and another PON managed at the same central office 110 may be undersubscribed. For example, in particular circumstances, each PON 102, 104, 106, or 108 managed at the central office 110 may serve a different type of user. Particular PONs may serve business parks that use a large amount of bandwidth during the day, when employees are at work, and little bandwidth in the evening or on weekends, when employees go home. Other PONs may serve residential users that use little bandwidth during the day, when the users are at work, and a greater amount of bandwidth in the evening and on weekends when the users are at home. Where PONs are implemented in such a manner, the business park PONs may be inefficiently at capacity during the day while the residential PONs are undersubscribed, and the residential PONs may be inefficiently at capacity in the evenings and weekends while the business park PONs are undersubscribed. A solution for providing the needed downstream bandwidth would thus be advantageous in particular circumstances.

Figure 3:
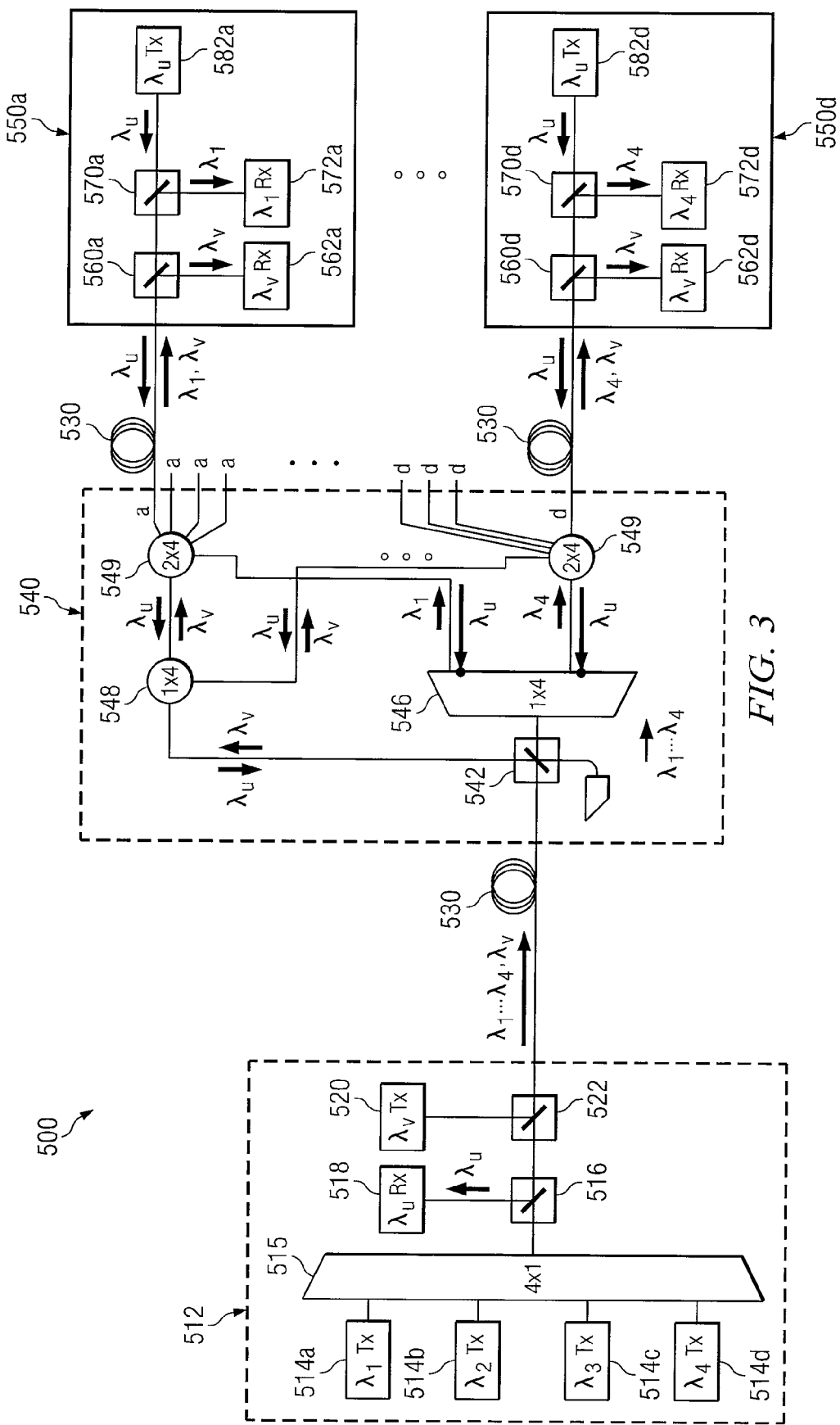
FIG. 3 is a diagram illustrating an example HPON.

FIG. 3 is a diagram illustrating an example HPON 500. Upgrading each PSPON 100 to HPON 500 may be one solution for providing the needed downstream bandwidth in the example situation above. However, as discussed further below in conjunction with FIG. 5, upgrading each PSPON 100 to an HPON 500 may not be the most cost-effective solution for some network operators in some circumstances.

Example HPON 500 comprises OLT 512, optical fiber 530, RN 540, and ONUs 550 and is a hybrid between a PSPON and a WDMPON. Example HPON 500 provides greater downstream capacity than a PSPON by having groups of two or more ONUs 550 share downstream WDM wavelengths. It should be noted that an HPON generally refers to any suitable PON that is not a full WDMPON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

OLT 512 (which may be an example of an upstream terminal) may reside at the carrier's central office and comprises transmitters 514, multiplexer 515, filter 516 and receiver 518, and transmitter 520 and filter 522. Each transmitter 514a-514d may comprise any suitable transmitter and is operable to transmit traffic over a corresponding wavelength, $\lambda_1$-$\lambda_4$, respectively. It should be noted that although example HPON 500 does not provide WDM for upstream traffic, it may be economical to implement transceivers (transmitter and receiver) in OLT 512, instead of only transmitters 514, in anticipation of a further upgrade to WDM upstream. It should further be noted that although only four transmitters are illustrated in example HPON 500, any suitable number of transmitters (or transceivers) may be included.

Multiplexer 515 comprises any suitable multiplexer/demultiplexer (and may be considered a wavelength router) and is operable to combine the traffic in $\lambda_1$-$\lambda_4$ into one signal. In particular example networks, multiplexer 515 may comprise a cyclic multiplexer operable to receive and combine the traffic in more than one wavelength through each port. In other example networks, multiplexer 512 may be a typical N×1 multiplexer operable to receive only the traffic in one wavelength through each port.

Filter 516 comprises any suitable filter operable to receive the traffic in $\lambda_1$-$\lambda_4$ from multiplexer 515 and pass the traffic in $\lambda_1$-$\lambda_4$ to filter 522. In the upstream direction, filter 516 is operable to receive traffic in $\lambda_u$ and direct traffic in $\lambda_u$ to receiver 518. Receiver 518 may comprise any suitable receiver operable to receive and process upstream traffic from ONUs 550 carried over time-shared $\lambda_u$.

Transmitter 520 comprises any suitable transmitter and is operable to transmit traffic over $\lambda_v$ for eventual broadcast to all ONUs 550. Transmitter 520 is further operable to direct the traffic to filter 522. In particular embodiments, transmitter 520 may transmit analog video traffic over $\lambda_v$. In alternative embodiments, transmitter 520 may transmit digital data traffic. It should be noted that, although a single transmitter 520 is illustrated, OLT 512 may comprise any suitable number of transmitters operable to transmit traffic for eventual broadcast to all ONUs 550.

Filter 522 is operable to receive the traffic in $\lambda_v$ and the traffic in $\lambda_1$-$\lambda_4$ and combine the traffic. Filter 522 is also operable to direct the combined traffic over fiber 530 to RN 540. In the upstream direction, filter 522 is operable to receive traffic in $\lambda_u$ and direct the traffic in $\lambda_u$ to filter 516.

Optical fiber 530 may comprise any suitable fiber to carry upstream and downstream traffic. In certain HPONs 500, optical fiber 530 may comprise, for example, bidirectional optical fiber. In other HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 512, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 512. It should be noted that although RN 540 is referred to as a remote node, "remote" refers to RN 540 being communicatively coupled to OLT 512 and ONUs 550 in any suitable spatial arrangement. A remote node may also generally be referred to as a distribution node.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 512.

Multiplexer 546 may comprise any suitable multiplexer/demultiplexer (and may be considered a wavelength router) and is operable to receive the signal comprising the traffic in $\lambda_1$-$\lambda_4$ and demultiplex the signal. Each output port of multiplexer 546 is operable to forward the traffic in a corresponding one of $\lambda_1$-$\lambda_4$ to a corresponding secondary power splitter 549. In the upstream direction, multiplexer 546 is operable to receive and terminate the traffic in $\lambda_u$, as ONUs 550 of example HPON 500 time-share $\lambda_u$ (and do not transmit traffic over multiple upstream wavelengths). Alternatively, multiplexer 546 may forward this traffic to filter 542 for suitable termination (where termination may be performed internally or externally).

It should be noted that multiplexer 546 may comprise a cyclic multiplexer or any other suitable type of multiplexer and may have any suitable number of ports. Also, although one multiplexer 546 is illustrated in remote node 540 of FIG. 3, in alternative remote nodes, multiplexer 546 may comprise two or more separate multiplexers receiving downstream signals from one or more upstream sources and forwarding the traffic downstream such that ONUs 550 share wavelengths. It should further be noted that the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths.

Primary power splitter 548 may comprise any suitable power splitter operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 512. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT. Each ONU 550 comprises a filter 560, receiver 562, filter 570, receiver 572, and transmitter 582. Each filter 560 may comprise any suitable filter operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver operable to receive the traffic transmitted in $\lambda_v$ and process the traffic. Each filter 570 may comprise any suitable filter operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter operable to transmit traffic over $\lambda_u$ in the upstream direction, applying a suitable protocol to time-share $\lambda_u$ with the other ONUs 550.

It should be noted that although four ONUs 550 are illustrated as being part of a group of ONUs 550 in HPON 500, any suitable number of ONUs 550 may be part of a group sharing a downstream wavelength. In addition, there may be multiple groups each sharing a different downstream wavelength. For example, ONUs 550a may share $\lambda_1$, ONUs 550b (not illustrated) may share $\lambda_2$, ONUs 550c (not illustrated) may share $\lambda_3$, and ONUs 550d may share $\lambda_4$. Also, one or more ONUs 550 may be a part of more than one group in some networks. It should also be noted that any suitable number of ONUs 550 may be implemented in the network.

It should further be noted that ONUs 550 may be adjusted in an alternative upgrade to transmit traffic over multiple wavelengths (which may be combined by PS 548 of RN 540) to be received by receivers corresponding to transmitters 514 at OLT 512 (in which case filter 516 may or may not be taken out of the line). In an alternative upgrade, each group of ONUs 550 sharing a wavelength may transmit upstream traffic in a separate wavelength, multiplexer 546 may multiplex these wavelengths at RN 540, and receivers corresponding to transmitters 514 may receive the traffic in these wavelengths at OLT 512.

In operation, transmitters 514a-514d of OLT 512 transmit traffic at $\lambda_1$-$\lambda_4$, respectively, and forward the traffic to multiplexer 515. Multiplexer 515, which may include, for example, a cyclic multiplexer, combines the traffic in the four wavelengths into one signal and forwards the signal to filter 516. Filter 516 passes the downstream signal to filter 522. Transmitter 20 of OLT 512 also transmits traffic at $\lambda_v$ and forwards the traffic to filter 522. Filter 522 receives the traffic in $\lambda_1$-$\lambda_4$ and $\lambda_v$ and directs the traffic over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$.

Each secondary power splitter 549 thus receives a copy of traffic in $\lambda_v$ from primary power splitter 548 and traffic in a corresponding one of $\lambda_1$-$\lambda_4$ from multiplexer 546, combines the traffic into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. In the illustrated embodiment, ONUs 550a share $\lambda_1$, ONUs 550b (not illustrated) share $\lambda_2$, ONUs 550c (not illustrated) share $\lambda_3$, and ONUs 550d share $\lambda_4$. It should be noted again that the groups of ONUs 550 sharing a wavelength may be different than those illustrated in FIG. 3, and groups of wavelength-sharing ONUs 550 may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (e.g., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs 550 does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 512. Fiber 530 carries the traffic in $\lambda_u$ to filter 522 of OLT 512. Filter 522 receives the traffic in $\lambda_u$ and passes the traffic to filter 516. Filter 516 receives the traffic in $\lambda_u$ and directs the traffic toward receiver 518. Receiver 518 receives the traffic and processes it.

Modifications, additions, or omissions may be made to the example HPON 500 described without departing from the scope of the invention. The components of the example HPON 500 described may be integrated or separated according to particular needs. Moreover, the operations of the example HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 4:
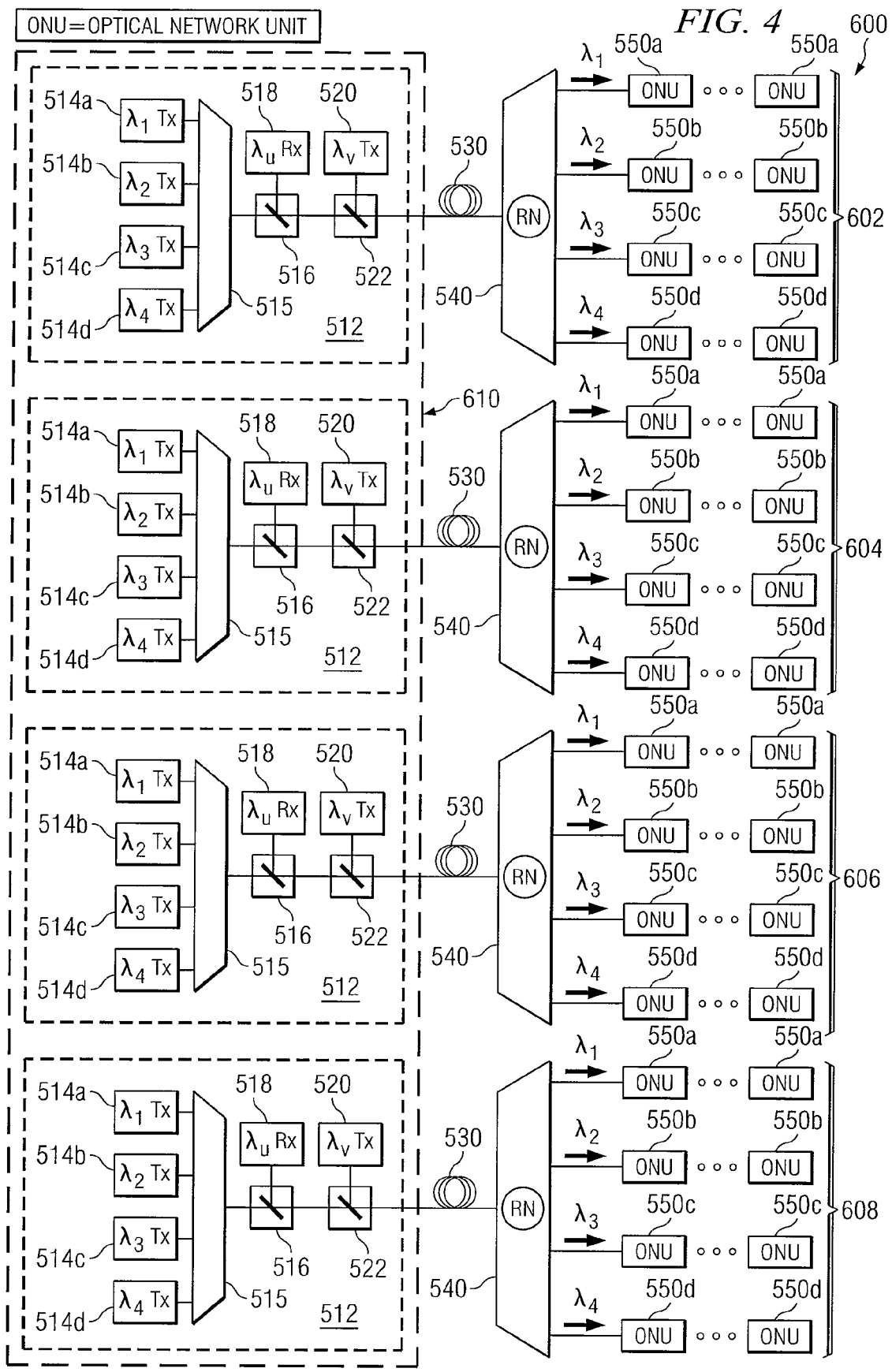
FIG. 4 is a diagram illustrating a set of example HPONs managed at a carrier's central office.

FIG. 4 is a diagram illustrating a set 600 of example HPONs 602, 604, 606, and 608 managed at a carrier's central office 610. Each HPON 602, 604, 606, or 608 comprises an OLT 512, optical fiber 530, an RN 540, and ONUs 550. OLT 512, optical fiber 530, RN 540, and ONUs 550 have been described above in conjunction with FIG. 3 and thus will not be described again in detail. It should be noted, however, that OLTs 512 of HPONs 602, 604, 606, and 608 may reside on the same OLT card at the carrier's central office 610 in particular circumstances.

As illustrated in FIG. 4, the downstream bandwidth for each HPON 602, 604, 606, or 608 is four times greater than that of a corresponding PSPON 102, 104, 106, or 108 of FIG. 2. Thus, a network operator managing PSPONs 102, 104, 106, and 108 may satisfy increased bandwidth usage by upgrading each PSPON to an HPON. However, some network operators may regard such an upgrade as cost-inefficient in particular circumstances. For example, network operators may regard such an upgrade as cost-inefficient where bandwidth usage does not yet justify HPON capacity and/or where subscribers' sensitivity to cost is high. These network operators may desire an intermediate upgrade between the capacity of the PSPONs of FIG. 2 and the capacity of the HPONs of FIG. 4, an upgrade that satisfies increased bandwidth usage more gradually and in a more cost-efficient manner.

Figure 5:
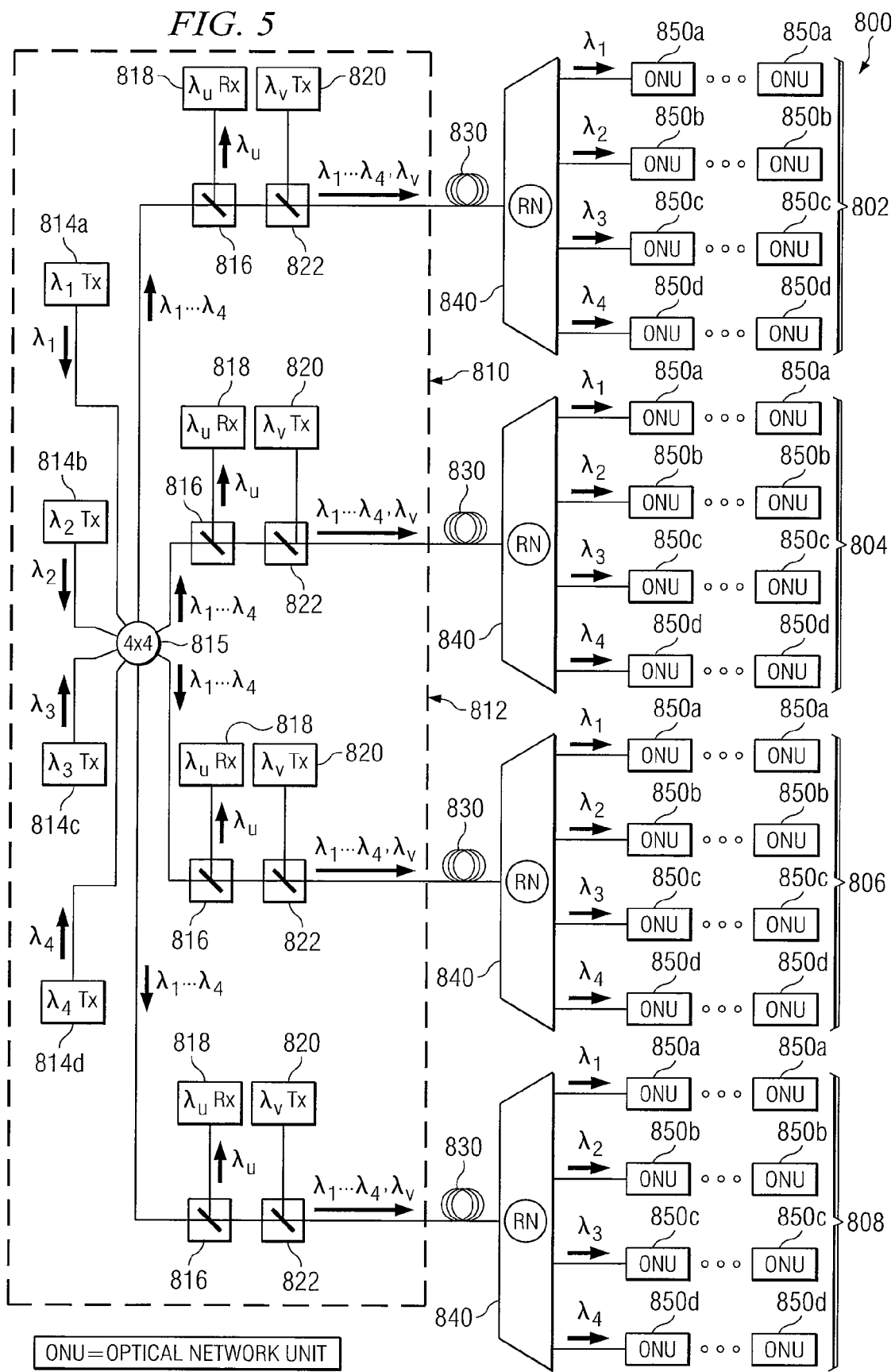
FIG. 5 is a diagram illustrating an example PON system upgraded from the set of example PSPONs of FIG. 2 according to a particular embodiment of the invention.

FIG. 5 is a diagram illustrating an example PON system 800 upgraded from the set of example PSPONs of FIG. 2 according to a particular embodiment of the invention. In PON system 800, four downstream wavelengths, $\lambda_1$-$\lambda_4$, transmitted by OLT 812 at central office 810 are shared by ONUs 850a, 850b, 850c, and 850d distributed in multiple PONs 802, 804, 806, and 808. In this manner, although the amount of total downstream bandwidth may be the same as that in the set 100 of the PSPONs of FIG. 2, the distribution of downstream bandwidth among ONUs 850 may be more efficient. Also, as described in more detail below, PON system 800 may be upgraded to provide greater bandwidth per ONU 850 by disconnecting individual ONUs 850 or individual RNs 840 connected to the OLT 812, thereby allocating more bandwidth to the connected ONUs 850. In particular embodiments, OLT 812 need not be replaced in such an upgrade.

PON system 800 comprises PONs 802, 804, 806, and 808. PONs 802, 804, 806, and 808 share OLT 812 at central office 810. Each PON 802, 804, 806, or 808 also comprises corresponding optical fiber 830, an RN 840, and ONUs 850. Optical fiber 830 and ONUs 850 may be the same as optical fiber 30 and ONUs 50 (and/or ONUs 550), respectively, described above in conjunction with FIG. 2 and thus will not be described again in detail. RNs 840 may be upgrades to RNs 40 of FIG. 2 and may be the same as RNs 540 described above in conjunction with FIG. 4 and thus will also not be described again in detail.

OLT 812 (which may be an example of an upstream terminal) may reside at the carrier's central office 810 and comprises transmitters 814, power splitter 815, filters 816 and receivers 818, and transmitters 820 and filters 822. Transmitters 814a-814d may be upgrades to transmitters 14 of FIG. 2 and may be the same as transmitters 514a-514d, respectively, described above in conjunction with FIG. 3 and thus will not be described again in detail. Filters 816 and 822 may be upgrades to filters 16 and 22, respectively, of FIG. 2 and may be the same as filters 516 and 522, respectively, described above in conjunction with FIG. 4 and thus will not be described again. Receivers 818 and transmitters 820 may be the same as receivers 18 and transmitters 20, respectively, described above in conjunction with FIG. 2 and thus will not be described again in detail. It should be noted that, in particular embodiments, OLT 812 may comprise a single OLT card at central office 810.

Power splitter 815 at OLT 812 may comprise any suitable power splitter operable to receive the traffic in $\lambda_1$-$\lambda_4$ from transmitters 814a-814d, respectively, combine the received traffic, and split the combined traffic into four copies. Primary power splitter 815 is further operable to forward each copy to a corresponding filter 816. In the upstream direction, primary power splitter 815 does not receive traffic in the illustrated embodiment. Instead, filters 816, positioned downstream of power splitter 815 in OLT 812, direct the upstream traffic to receivers 818. Routing upstream traffic to receivers 818 before the traffic reaches power splitter 815 prevents increased power loss to be experienced by the traffic.

It should be noted that although primary power splitter 815 is a 4×4 power splitter in the illustrated embodiment, any suitable M×N power splitter or combination of power splitters may be used in alternative embodiments. Also, although power splitter 815 is illustrated as residing at OLT 812, in alternative embodiments, power splitter 815 may reside in any other suitable location (e.g., in a module external to OLT 812) and be used in conjunction with OLT 812 to combine and split downstream traffic. It should further be noted that, in particular embodiments, power splitter 815 may be replaced by a multiplexer and power splitter combination.

In operation, transmitters 814a-814d of OLT 812 transmit traffic at $\lambda_1$-$\lambda_4$, respectively, and forward the traffic to power splitter 815. Power splitter 815 combines the traffic in $\lambda_1$-$\lambda_4$, splits the combined traffic into four copies, and forwards each copy to a corresponding filter 816. Filter 816 passes the copy to a corresponding filter 522. Each transmitter 820 of OLT 812 also transmits traffic at $\lambda_v$ and forwards the traffic to a corresponding filter 822. Each filter 822 receives the traffic in $\lambda_1$-$\lambda_4$ and $\lambda_v$ and directs the traffic over optical fiber 830 to the corresponding RN 840. As described above in conjunction with RN 540 of FIG. 3, each RN 840 broadcasts the traffic in $\lambda_v$ to downstream ONUs 850 in the PON. In addition, each RN 840 demultiplexes the traffic in $\lambda_1$-$\lambda_4$ and forwards the traffic in one of $\lambda_1$-$\lambda_4$ to a corresponding group of downstream, wavelength-sharing ONUs 850. Each ONU 850 receives its respective traffic and processes the traffic according to a suitable protocol. In the upstream direction, ONUs 850 timeshare transmission of traffic at $\lambda_u$, as described in more detail above in conjunction with the ONUs 550 of FIG. 3.

As can be observed, ONUs 850a in PONs 202, 204, 206, and 208 share $\lambda_1$, ONUs 850b in PONs 202, 204, 206, and 208 share $\lambda_2$, ONUs 850c in PONs 202, 204, 206, and 208 share $\lambda_3$, and ONUs 850d in PONs 202, 204, 206, and 208 share $\lambda_4$. Thus, although PON system 800 provides the same amount of downstream bandwidth as is provided by the set 100 of PSPONs of FIG. 2, downstream WDM wavelengths are shared among different PONs. Sharing of wavelengths among different PONs may allow for a more efficient distribution of bandwidth, as users of the same PON may use bandwidth competitively with each other while users of different PONs may use bandwidth complementarily with each other. Generally, by allowing bandwidth to be shared among different types of users, where each type has a particular, average bandwidth usage characteristic and where at least one type is concentrated in at least one PON 802, 804, 806, or 808, a more efficient distribution of downstream bandwidth may result.

For example, bandwidth usage in a particular PON may vary in a particular manner. Thus, average bandwidth usage may be high at certain times and low at other times. Sharing of wavelengths among different PONs 802, 804, 806, and 808 having different average bandwidth usage characteristics may provide greater bandwidth per user (because fewer users may be competing for bandwidth at the same time). By sharing $\lambda_1$, ONUs 850a in the four different PONs may more efficiently use bandwidth. For example, at a certain time, ONUs 850a in PON 802 may use greater average bandwidth than ONUs 850a in PONs 804, 806, and 808. At other times, ONUs 850a in other one or more PONs may use greater average bandwidth. By sharing bandwidth across PONs having different average bandwidth usage characteristics, more efficient bandwidth distribution may be achieved.

As another example, a first type of user may include business parks, and this type of user may be concentrated (e.g., exclusively) in PONs 802 and 804. Business parks may use high average bandwidth during the day, when employees are at work, and little average bandwidth in the evening or on weekends, when employees go home. A second type of user may include residential users, and this type of user may be concentrated (e.g., exclusively) in PON 806. Residential users may use little average bandwidth during the day, when the users are at work, and a greater amount of average bandwidth in the evening and on weekends when the users are at home. A third type of user may include mixed business and residential users, and this type of user may be served by PON 808. Mixed-type users may use fairly constant average bandwidth (or slightly varying average bandwidth) during the day and evening. By allowing business park users of PONs 802 and 804 to share bandwidth with residential users of PON 806 and mixed-type users of PON 808, PON system 800 more efficiently distributes downstream bandwidth. For example, business park users of PONs 802 and 804 and 808 may be allocated more of the bandwidth during the day, and residential users of PONs 806 and 808 may be allocated more of the bandwidth in the evening and on weekends. It should be noted that, in particular embodiments, bandwidth may be allocated substantially equally to the wavelength-sharing ONUs 850 of different PONs at certain times (and greater bandwidth need not be allocated to one set of one or more ONUs at any given time).

In particular embodiments, the allocation of bandwidth among ONUs 850 of multiple PONs may be dynamic, based on usage. Thus, as an example only, when usage is high for particular ONUs 850a of PONs 802, 804, 806 or 808, greater bandwidth (e.g., a greater number or size of timeslots for traffic in $\lambda_1$) may be allocated to those ONUs 850a for which usage is high than to other ONUs 850a for which usage is low. As usage changes for ONUs 850a, bandwidth may be dynamically reallocated among ONUs 850a based on the change in usage. In alternative embodiments, the allocation of bandwidth among ONUs 850 of different PONs may be fixed and pre-set. Thus, as an example only, greater bandwidth may be pre-allocated to ONUs 850a of PONs 802 and 804 (e.g., business park PONs) during the day than to ONUs 850a of PONs 806 and 808 (e.g., residential or mixed-use PONs) during the evening. In yet alternative embodiments, bandwidth may be allocated in any other suitable manner. In particular embodiments, OLT 812 may allocate bandwidth to ONUs 850 (e.g., dynamically or in a pre-determined manner).

PON system 800 may be implemented without incurring several of the costs of upgrading each PSPON of FIG. 2 to an HPON of FIG. 4. In particular, only four, downstream WDM transmitters 814 (transmitting at $\lambda_1$-$\lambda_4$) and one 4×4 power splitter 815 may be purchased and installed, as opposed to purchasing and installing sixteen downstream WDM transmitters 614 and four multiplexers 615 as in FIG. 4. These cost savings may be substantial for particular operators. In alternative embodiments where PON system 800 is implemented as an alternative to implementing the PSPONs of FIG. 2, any additional costs of implementing PON system 800 instead of the PSPONs may be minimal in particular circumstances.

PON system 800 may also be easily upgraded to provide greater bandwidth to particular ONUs 850. For example, particular ONUs 850, such as, for example, ONUs 850c and 850d of PONs 806 and 808, may be disconnected. After these ONUs are disconnected, half as many ONUs 850c and 850d (i.e., those in PONs 802 and 804) share $\lambda_3$ and $\lambda_4$, respectively, in PON system 800. These groups of remaining ONUs 850c and 860d each thus share twice as much downstream WDM bandwidth. Also, the fiber plant need not be changed. In addition, in particular embodiments, ONUs 850c and 850d of PONs 806 and 806 may be disconnected from PON system 800 without replacing the OLT card comprising OLT 812. The disconnected ONUs 850 may then be connected to one or more new OLT cards that may be installed. It should be noted that this type of upgrade may be an intermediate upgrade before upgrading either PON 802 or PON 804 so that the PON's corresponding set of ONUs 850 receive the same bandwidth as ONUs 550 of FIG. 4, as described further below.

As another example, particular RNs 840, such as, for example, the RNs of PONs 806 and 808 may be disconnected from OLT 812 to provide greater bandwidth to the ONUs 850 of PONs 802 and 804. After these RNs are disconnected, half as many ONUs 850a, 850b, 850c, and 850d share $\lambda_1$-$\lambda_4$, respectively, in PON system 800. These groups of remaining ONUs 850a, 850b, 850c, and 850d thus share twice as much WDM bandwidth. Also, the fiber plant need not be changed. In addition, in particular embodiments, RNs 840 of PONs 806 and 808 may be disconnected from PON system 800 without replacing the OLT card comprising OLT 812. The disconnected RNs 840 may then be connected to one or more new OLT cards that may be installed. It should be noted that this type of upgrade may be an intermediate upgrade before upgrading either PON 802 or PON 804 so that the PON's corresponding set of ONUs 850 receive the same bandwidth as ONUs 550 of FIG. 4, as described further below.

PON system 800 may be upgraded so that the ONUs 850 of a particular PON receive the same bandwidth as ONUs 550 of FIG. 4. For example, to upgrade PON system 800 so that the ONUs 850 of PON 802 receive the same bandwidth as ONUs 550 of HPON 602 in FIG. 4, the ONUs 850 of PONs 804, 806, and 808 may be disconnected from PON system 800. Alternatively, RNs 840 of PONs 804, 806, and 808 may be disconnected from OLT 812. After such an upgrade, ONUs 850 of PON 802 may be allocated all of the bandwidth of WDM wavelengths $\lambda_1$-$\lambda_4$. In particular embodiments, disconnected ONUs 850 or RNs 840 of PONs 804, 806, and 808 may be connected to one or more new OLT cards that may be installed.

It should be noted that, in alternative embodiments, PON system 800 may comprise any other suitable number of downstream WDM transmitters (besides four) that may transmit any suitable number of downstream WDM wavelengths. These transmitters may be required to transmit at greater power than the downstream transmitters of FIG. 3 (because of power losses associated with power splitter 815). In addition, PON system 800 may comprise any suitable number of RNs 840 and ONUs 850. Additionally, any suitable number of ONUs 850 (including no ONUs 850) in each PON 802, 804, 806, or 808 may share a particular wavelength.

It should also be noted that PON system 800 of FIG. 5 need not be an upgrade from the set 100 of PSPONs of FIG. 2; rather, PON system 800 may be an alternative to the set 100 of PSPONs in particular embodiments. Alternatively, PON system 800 may be an upgrade from a different set of PONs. It should further be noted that PON system 800 need not be upgraded to the set 600 of HPONs of FIG. 4. For example, in particular embodiments, PON system 800 may not be upgraded or may be upgraded to a different set of one or more HPONs or one or more WDMPONs.

It should further be noted that, in an alternative embodiment to PON system 800, a multiplexer (e.g., similar to multiplexer 515) may be coupled downstream to transmitters 814 and upstream to power splitter 815. A filter (e.g., similar to filter 822) may be coupled to the line between the multiplexer and power splitter 815 and may couple a transmitter (e.g., similar to transmitter 820) transmitting traffic in $\lambda_v$ to the line. The filter may direct traffic in $\lambda_1$-$\lambda_4$ from the multiplexer and traffic in $\lambda_v$ from the coupled transmitter to power splitter 815. In such an embodiment, transmitters 820a-820d and filters 822a-822d would not be required, as traffic in $\lambda_v$ has already been transmitted. It should be noted that traffic in $\lambda_v$ may be added to traffic in $\lambda_1$-$\lambda_4$ in any other suitable manner, using one or more $\lambda_v$ transmitters, in alternative embodiments.

It should also be noted that, in particular embodiments, OLT 812, after combining the traffic in $\lambda_1$-$\lambda_4$, may split the combined traffic into multiple copies for each RN 840. OLT 812 may be connected to multiple input ports at each RN 840 via multiple fibers 830 and may forward a copy of the combined traffic to each input port. Each copy may pass to a corresponding wavelength router of multiple wavelength routers at an RN 840. Each wavelength router may route the WDM traffic in its copy to a subset of ONUs in the PON. For example, in particular embodiments, traffic in $\lambda_1$ may be routed to a first ONU in the subset, traffic in $\lambda_2$ may be routed to a second ONU in the subset, traffic in $\lambda_3$ may be routed to a third ONU in the subset, and traffic in $\lambda_4$ may be routed to a fourth ONU in the subset. Thus, in particular embodiments, secondary power splitters at an RN 840 may not be needed. In an upgrade to HPON capacity for a PON in such a PON system, in particular embodiments, the other PONs may be disconnected from OLT 812, and the OLT 812 may be modified to split the combined traffic into only that number forwarded to the downstream RN 840 (thereby reducing insertion loss). In addition, in particular embodiments, the multiple upstream receivers at the OLT may be reused for the remaining PON, thereby increasing upstream bandwidth.

Modifications, additions, or omissions may be made to the example systems and methods described without departing from the scope of the invention. The components of the example methods and systems described may be integrated or separated according to particular needs. Moreover, the operations of the example methods and systems described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for transmitting traffic in a plurality of passive optical networks (PONs), comprising:
   transmitting traffic at a first wavelength, at a second wavelength and at a third wavelength from an optical line terminal (OLT);
   combining the traffic in the first wavelength and the traffic in the second wavelength;
   splitting the combined traffic into a plurality of copies;
   forwarding a first copy to a first wavelength router at a first distribution node and forwarding a second copy to a second wavelength router at a second distribution node, wherein the first wavelength router is coupled to a first set of optical network units (ONUs) and the second wavelength router is coupled to a second set of ONUs;
   routing the first copy such that only a subset of one or more ONUs in the first set of ONUs receives the traffic in the first wavelength and only a subset of one or more ONUs in the first set of ONUs receives the traffic in the second wavelength;
   routing the second copy such that only a subset of one or more ONUs in the second set of ONUs receives the traffic in the first wavelength and only a subset of one or more ONUs in the second set of ONUs receives the traffic in the second wavelength; and
   forwarding the traffic in the third wavelength to the first and second distribution nodes;
   forwarding the traffic in the third wavelength to each ONU in the first and second sets of ONUs.

2. The method of claim 1, further comprising dynamically allocating traffic bandwidth in the first and second wavelengths to corresponding ONUs based on usage.

3. The method of claim 1, further comprising allocating traffic bandwidth in the first and second wavelengths to corresponding ONUs in a pre-determined manner.

4. The method of claim 1, further comprising:
   receiving traffic at the OLT in a first upstream wavelength time-shared by the first set of ONUs; and
   receiving traffic at the OLT in a second upstream wavelength time-shared by the second set of ONUs.

5. The method of claim 4, wherein the first upstream wavelength and the second upstream wavelength comprise the same wavelength band.

6. The method of claim 1, further comprising:
   transmitting traffic at a third wavelength and at a fourth wavelength from the OLT;
   combining the traffic in the first wavelength, the traffic in the second wavelength, the traffic in the third wavelength, and the traffic in the fourth wavelength, and splitting the combined traffic into a plurality of copies;
   forwarding a third copy to a third wavelength router at a third distribution node and forwarding a fourth copy to a fourth wavelength router at a fourth distribution node, wherein the third wavelength router is coupled to a third set of ONUs and the fourth wavelength router is coupled to a fourth set of ONUs;
   routing the first copy such that only a subset of one or more ONUs in the first set of ONUs receives the traffic in the first wavelength, only a subset of one or more ONUs in the first set of ONUs receives the traffic in the second wavelength, only a subset of one or more ONUs in the first set of ONUs receives the traffic in the third wavelength, and only a subset of one or more ONUs in the first set of ONUs receives the traffic in the fourth wavelength;
   routing the second copy such that only a subset of one or more ONUs in the second set of ONUs receives the traffic in the first wavelength, only a subset of one or more ONUs in the second set of ONUs receives the traffic in the second wavelength, only a subset of one or more ONUs in the second set of ONUs receives the traffic in the third wavelength, and only a subset of one or more ONUs in the second set of ONUs receives the traffic in the fourth wavelength;
   routing the third copy such that only a subset of one or more ONUs in the third set of ONUs receives the traffic in the first wavelength, only a subset of one or more ONUs in the third set of ONUs receives the traffic in the second wavelength, only a subset of one or more ONUs in the third set of ONUs receives the traffic in the third wavelength, and only a subset of one or more ONUs in the third set of ONUs receives the traffic in the fourth wavelength; and
   routing the fourth copy such that only a subset of one or more ONUs in the fourth set of ONUs receives the traffic in the first wavelength, only a subset of one or more ONUs in the fourth set of ONUs receives the traffic in the second wavelength, only a subset of one or more ONUs in the fourth set of ONUs receives the traffic in the third wavelength, and only a subset of one or more ONUs in the fourth set of ONUs receives the traffic in the fourth wavelength.

7. A system for transmitting traffic in a plurality of passive optical networks (PONs), comprising:
   an optical line terminal (OLT) configured to:
     transmit traffic at a first wavelengths, at a second wavelength and at a third wavelength;
     combine the traffic in the first wavelength and the traffic in the second wavelength;
     split the combined traffic into a plurality of copies;
     forward a first copy to a first wavelength router at a first distribution node and forward a second copy to a second wavelength router at a second distribution node, wherein the first wavelength router is coupled to a first set of optical network units (ONUs) and the second wavelength router is coupled to a second set of ONUs; and forward the traffic in the third wavelength to the first and second distribution nodes;

a first distribution node comprising the first wavelength router, wherein the first wavelength router is configured to route the first copy such that only a subset of one or more ONUs in the first set of ONUs receives the traffic in the first wavelength and only a subset of one or more ONUs in the first set of ONUs receives the traffic in the second wavelength; and a second distribution node comprising the second wavelength router, wherein the second wavelength router is configured to route the second copy such that only a subset of one or more ONUs in the second set of ONUs receives the traffic in the first wavelength and only a subset of one or more ONUs in the second set of ONUs receives the traffic in the second wavelengths;

wherein the first distribution node is further configured to forward the traffic in the third wavelength to each ONU in the first set of ONUs; and wherein the second distribution node is further configured to forward the traffic in the third wavelength to each ONU in the second set of ONUs.

8. The system of claim 7, wherein the OLT is further configured to dynamically allocate traffic bandwidth in the first and second wavelengths to corresponding ONUs based on usage.

9. The system of claim 7, wherein the OLT is further configured to allocate traffic bandwidth in the first and second wavelengths to corresponding ONUs in a pre-determined manner.

10. The system of claim 7, wherein the OLT is further configured to:
receive traffic in a first upstream wavelength time-shared by the first set of ONUs; and
receive traffic in a second upstream wavelength time-shared by the second set of ONUs.

11. The system of claim 10, wherein the first upstream wavelength and the second upstream wavelength comprise the same wavelength band.

12. The system of claim 10, wherein:
the traffic in the first wavelength and the traffic in the second wavelength are combined at a single power splitter at the OLT;
the combined traffic is split at the single power splitter at the OLT;
the traffic in the first upstream wavelength is received at a first receiver at the OLT;
the traffic in the second upstream wavelength is received at a second receiver at the OLT; and
the traffic in at least one of the first upstream wavelength and the second upstream wavelength is not routed through the single power splitter at the OLT before being received at the corresponding receiver at the OLT.

13. The system of claim 7, wherein:
the traffic in the first wavelength and the traffic in the second wavelength are combined at a single power splitter at the OLT; and
the combined traffic is split at the single power splitter at the OLT.

14. The system of claim 7, wherein:
the OLT is further configured to:
transmit traffic at a third wavelength and at a fourth wavelength;
combine the traffic in the first wavelength, the traffic in the second wavelength, the traffic in the third wavelength, and the traffic in the fourth wavelength;
split the combined traffic into a plurality of copies; and
forward a third copy to a third wavelength router at a third distribution node and forward a fourth copy to a fourth wavelength router at a fourth distribution node, wherein the third wavelength router is coupled to a third set of ONUs and the fourth wavelength router is coupled to a fourth set of ONUs;

the first wavelength router is further configured to route the first copy such that only a subset of one or more ONUs in the first set of ONUs receives the traffic in the first wavelength, only a subset of one or more ONUs in the first set of ONUs receives the traffic in the second wavelength, only a subset of one or more ONUs in the first set of ONUs receives the traffic in the third wavelength, and only a subset of one or more ONUs in the first set of ONUs receives the traffic in the fourth wavelength; and the second wavelength router is further configured to route the second copy such that only a subset of one or more ONUs in the second set of ONUs receives the traffic in the first wavelength, only a subset of one or more ONUs in the second set of ONUs receives the traffic in the second wavelength, only a subset of one or more ONUs in the second set of ONUs receives the traffic in the third wavelength, and only a subset of one or more ONUs in the second set of ONUs receives the traffic in the fourth wavelength;

the system further comprising:
a third distribution node comprising the third wavelength router, wherein the third wavelength router is configured to route the third copy such that only a subset of one or more ONUs in the third set of ONUs receives the traffic in the first wavelength, only a subset of one or more ONUs in the third set of ONUs receives the traffic in the second wavelength, only a subset of one or more ONUs in the third set of ONUs receives the traffic in the third wavelength, and only a subset of one or more ONUs in the third set of ONUs receives the traffic in the fourth wavelength; and a fourth distribution node comprising the fourth wavelength router, wherein the fourth wavelength router is configured to route the fourth copy such that only a subset of one or more ONUs in the fourth set of ONUs receives the traffic in the first wavelength, only a subset of one or more ONUs in the fourth set of ONUs receives the traffic in the second wavelength, only a subset of one or more ONUs in the fourth set of ONUs receives the traffic in the third wavelength, and only a subset of one or more ONUs in the fourth set of ONUs receives the traffic in the fourth wavelength.

* * * * *